Figure 2:
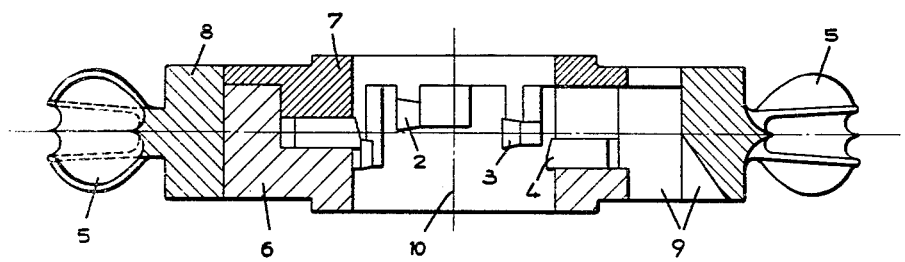

June 14, 1960   H. LINDEMANN   2,940,348
PEELING MACHINES
Filed Dec. 3, 1957   2 Sheets-Sheet 1

INVENTOR
HANS LINDEMANN

BY Dietz and Gray
ATTORNEYS

June 14, 1960 H. LINDEMANN 2,940,348
PEELING MACHINES

Filed Dec. 3, 1957 2 Sheets-Sheet 2

INVENTOR
HANS LINDEMANN
BY Dicks and Gray
ATTORNEYS

United States Patent Office 2,940,348
Patented June 14, 1960

2,940,348
PEELING MACHINES

Hans Lindemann, Bielefeld, Germany, assignor to Theodor Calow, trading as Th. Calow & Co., Maschinenfabrik u. Eisengiesserei, Bielefeld, Germany Filed Dec. 3, 1957, Ser. No. 700,323

Claims priority, application Germany Dec. 4, 1956

10 Claims. (Cl. 82—20)

This invention relates to improvements in or relating to peeling or bar peeling machines.

Material to be machined by peeling has previously been fed in a horizontal direction to the cutter head of a peeling machine, which head carries cutters and rotates about a horizontal axis. The introduction of hard metal peeling cutters allows an increase in the cutting speed. The resulting increase in the number of revolutions amounts to a multiple of the number of revolutions at which machines provided with high speed steel cutters are run. If it is desired to carry out a peeling operation on a material of 10 mm. diameter at a cutting speed of 100 m./min., then a machine giving about 3,000 rev./min. is required. With a 5 mm. stock this value increases to 6,000 rev./min. In new peeling machines, specially adapted for hard metal cutters it is now possible to work also with ceramic cutting tools which allow cutting speeds up to 600 m./min. for the machining of steel. From this follows that the cutter head with a diameter of 10 mm. has to run at a rate of 18,000 rev./min. and with a diameter of 5 mm. even at a rate of 36,000 rev./min. It is to be expected that in the near future even the speed of 500 m./min. will be considerably exceeded.

The mounting of the cutter head produces great difficulties at these speeds. Assuming the same rates of cutting, the mounting problem for large diameter work pieces to be machined in peeling machines can be solved more readily than in the case of those with small diameters. The reason for this lies in the following: In a machine adapted for peeling material of 200 mm. cutter head runs at a cutting speed of 600 m./min. giving 900 rev./min. With a machine for peeling of material of 20 mm., the cutter head, on the other hand, makes 9,000 rev./min., if the cutting speed remains 600 m./min. Each type of peeling machine, of 200 mm. diameter and 20 mm. diameter, requires a particular bearing size, which can be put at approximately the ratio of 1:10. The centrifugal forces on the balls or rollers arising in these bearings, e.g. roller bearings, increase as the square of the number of revolutions, but only in straight proportion to its diameter. A bearing ten times smaller will, therefore, rotate at ten times the number of revolutions and has to overcome much greater centrifugal forces, in fact, centrifugal forces ten times greater than the bearing for the correspondingly larger machine. It will be seen from this comparison, that it is particularly difficult to control the bearings for the small peeling machines.

It is an object of the invention to overcome these difficulties and in addition to arrange that the space required by such a peeling machine is as small as possible. Basically the invention departs from the arrangement hitherto used in that it omits the previously used roller bearings for the cutter head and effects the mounting and the centering of the rotating cutter head by means of the cutters themselves sliding on the rod or bar material during cutting. Thus it becomes necessary, to ensure that the cutter head is supported during starting and before the introduction of the material to be peeled, and that during the peeling process the cutting forces occurring in the direction of feed are absorbed.

It is already known to have peeling machines for the machining of tubular and rod material having a rotary cutter head with a triple or multi cutter head, e.g. a multi cutter head in which at least two cutters are mounted in each of several planes, parallel to one another, and extending transversely to the axis of rotation of the cutter head. The number of cutters lying in the on plane corresponds to the number of cutters lying in parallel planes at varying distances from the axis of rotation of the cutter head. Such cutter heads were previously mounted by means of a hollow shaft in the housing of the peeling machine.

It has been stated above that it is necessary to support the cutter head only during the start and before the introduction of the material to be peeled, and care must also be taken that the cutting forces occurring during the peeling process in the direction of feed of the material are absorbed. If the axis of the cutter head is arranged, as was hitherto generally usual, in a horizontal plane, then the weight of the cutter head has to be absorbed by radial bearings and in addition axial thrust bearings have to be provided, in order to prevent a cutter head moving along in the direction of movement of the material. The provision of a radial bearing can, according to the invention, be avoided if the axis of rotation of the cutter head extends vertically, i.e. the material is fed in and removed in a vertical direction.

If the rotating cutter head were to be driven by means of a gear wheel or a belt drive, then, quite apart from the very considerable circumferential speeds and the transmission difficulties connected therewith, additional forces would have to be absorbed by the material to be peeled, which forces act only in one direction on the material to be peeled, which is held against rotation. Therefore, it would again be necessary to provide a radial bearing. According to a further feature of the invention, turbine blades are mounted peripherally on the cutter head, for example in the form of the blades of a Pelton wheel, and the turbine blades operated by compressed air or pressure fluid rotate the cutter head. If for the carrying out of the peeling process a cooling liquid is needed, then this can be subject to high pressure and can also be used as a propellant for the turbine.

In order to absorb the forces acting in an axial direction of the cutter head, and produced during the feeding of the material, it is possible to produce on both sides of the two end surfaces which extend transversely of the axis of rotation of the cutter head, compressed air or pressure fluid cushions or buffers, which maintain the head constantly in one and the same position. It is also possible to arrange the turbine blades or to allow the driving medium to act upon the turbine blades in such a manner that the cutter head is kept automatically in a selected position at a predetermined speed, which may be the normal speed of rotation of the cutter head.

The provision of pressure cushions or buffers on at least one end surface or on both end surfaces of the cutter head with a vertically extending axis has further special advantages in that the lubrication problem occurring during very high rates of rotation is also avoided.

When, for example, a Pelton wheel is used as the drive means for the cutter head of a diameter of 200 mm., and the cutter head rotates at 5,000 rev./min., the pressure fluid fed to the Pelton wheel must be at a pressure of about 70 to 100 atmospheres. The pressure medium can be used not only for driving the cutter head and for the production of one or more pressure cushions, but, if abrasive media are mixed therewith, it can be used simultaneously also for polishing the peeled material. It is only necessary then to branch off one or more pipes from the pressure medium conduits and to feed abrasive substances or the like into these pipes, which intimately mixed with the pressure medium are fed to the point where the peeled material is to be polished. The polishing agent can also be applied to the material after the peeling and only then is the jet of pressure medium applied to it for the purpose of polishing.

If the cutter head is to rotate at a substantially higher speed, then the pressure medium must also be at a correspondingly higher pressure. If the cutter head makes 30,000 rev./min., then the hydraulic pressure of a pressure fluid required to drive the Pelton wheel or the like having an average wheel diameter of 100 mm. amounts to 600 to 800 atmospheres. For the production of this pressure standard commercial pumps can be used.

Figure 1:
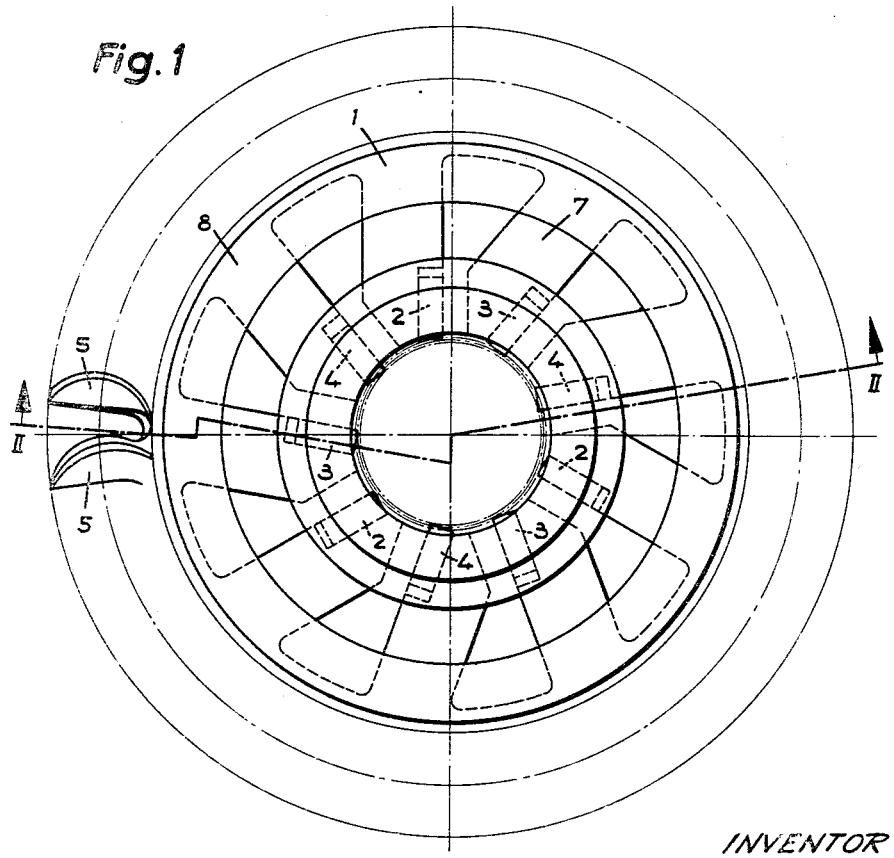
Figure 3:
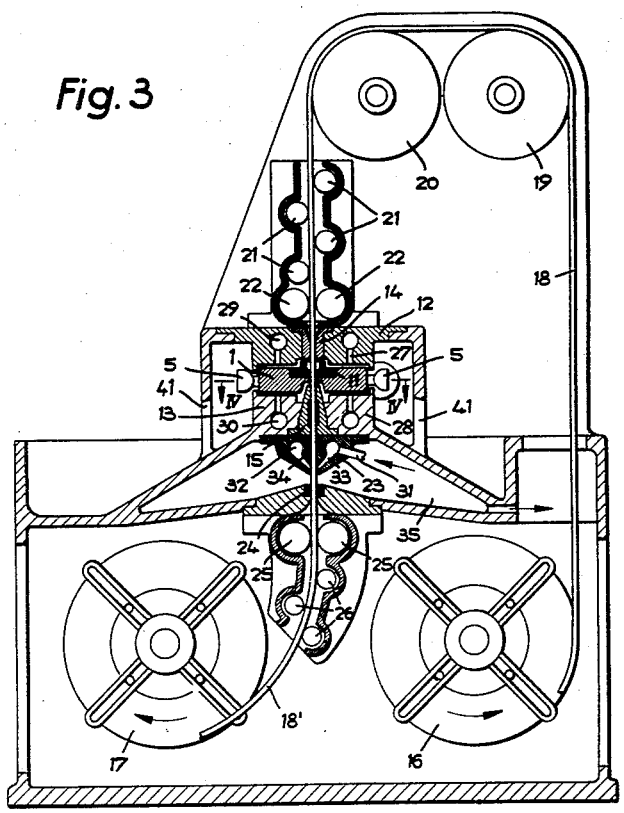
Figure 4:
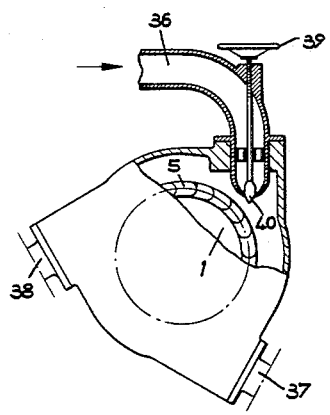

The invention will now be further described by reference to the accompanying drawings, which show embodiments by way of example according to the invention and in which:

Figure 1 is a plan view of a rotary cutter head which has three cutters in each of the several planes, lying parallel to one another, and has turbine blades around its periphery, Figure 2 is a section through the cutter head of Figure 1, along the line II—II of Figure 1, Figure 3 is a vertical section through a peeling machine according to the invention, and Figure 4 is a section through the peeling machine of Figure 3, taken along the line IV—IV of Figure 3.

Referring to Figures 1 and 2, 1 indicates a cutter head which, in each of three planes, which are parallel to one another, has three cutters 2, 3, 4, which are fixed in the cutter head, but which are adjustable without loosening the retaining means. At the periphery of the cutter head turbine blades 5 are provided acted upon by a pressure medium. Blades of a Pelton wheel are shown by way of example. The cutter head is preferably made up of at least three parts 6, 7, 8, fixedly mounted with respect to each other. The parts 6, 7, 8, are so shaped that sufficient outlets 9 for the metal peelings are provided. These outlets 9 for the metal peelings open out on the two side surfaces of the cutter head outside the region in which the pressure medium acts upon the surfaces.

Referring now to Figure 3, it will be seen that the cutter head 1 is so mounted in the housing of a peeling machine, that its axis of rotation 10 is vertical. The cutter head is preferably provided with a guide member 11. In the two housing sections 12, 13, which respectively face the two end surfaces of the cutter head 1 further guide means, such as bushes or the like, 14, 15 are provided. The wire material to be peeled is supplied from feed spool 16 and passes over guide rollers 19, 20 and a straightening device having rollers 21 and over feed rollers 22. Thence it passes through the guide bushing 14 and after peeling, leaves via guide bushing 15 to be wound on reel 17. A polishing device 23 is provided behind the cutter head 1 in the direction of movement of the wire to be peeled, after which the material is led via a guide 24 to draw off rollers 25 of a bending device having rollers 26 and is then wound up on the take up reel 17. If rods are to be peeled instead of wire, then the rollers 19, 20 and 26 as well as the reels 16, 17 are omitted and the rollers 22 and 25 are constructed and positioned to retain the rods secure against rotation, without thereby departing from the scope of the invention.

The surfaces of the housing sections 12, 13 facing the two end surfaces of the cutter head 1 have several bores or the like 27, 28, distributed uniformly around the periphery of the surfaces, from which a pressure medium can emerge, whose function it is to maintain the cutter head 1 in the same plane at all times. The pressure of the pressure medium emerging from the bores 27, 28 is therefore, different in bores 27 and 28 and must be regulated. It is obvious, that the pressure of the pressure medium emerging from the bores 28 must always be higher than the pressure of the pressure medium emerging from the bores 27, since during the feeding of the material the weight of the cutter head has to be absorbed, whereas during the peeling operation the forces arising from the cutting action have also to be absorbed.

The conduits leading to the spaces 29, 30 are connected to pressure producing devices. From one conduit and indeed from the one with the higher pressure, a conduit branches off, which is in connection with the conduit 31, so that in the space 32 of the housing 23 a correspondingly higher pressure is available. The compressed air or pressure fluid present in space 32 is conducted via the nozzle 33 to the wire 18 which has already been peeled, and the circumferential surface of which is coated with an abrasive or grinding paste as a result of the presence of an abrasive or grinding agent in space 34, so that upon contact of the pressure medium from space 32 a polishing action of the machined wire material can be obtained. An abrasive or grinding agent, can of course, also be introduced into the conduit 31. The pressure fluid then polishes the peeled wire during its passage through the space 35 not only as a result of its jet action, but also as a result of the addition of an abrasive or grinding agent. This polishing device can of course, also be used in other machines, for example in known peeling machines, if the cooling medium, mixed with abrasive or grinding agents, is brought to an appropriately high pressure and the peeled material is allowed to be acted upon by this pressure medium. In the present case such a polishing device is particularly beneficial because there is already provided a pressure medium for driving the cutter head 1 or its mounting.

The pressure medium, which is used for driving the cutter head 1, is preferably fed via the piping 36, 37 and 38 to the blades 5. The control of the quantity of pressure medium emerging from the pipes 36, 37, 38 is effected, as is known per se in turbines, by a needle valve 40 controlled by a hand wheel 39 (Figure 4). An outlet 41 for the pressure medium is provided.

Although the feeding and winding reels in the embodiment of Figure 3 are placed substantially next to one another, one of the reels can also be placed above, the other reel below the cutter head 1. In each case the feed reel is preferably mounted above the cutter head 1. It is likewise possible to vary or modify the individually cooperating elements of the machine from those shown in the embodiments.

I claim:

1. A peeling machine for finishing wire stock, comprising, in combination, feeding means for feeding the wire stock in one direction and including two stock-guiding elements located aligned for feeding the wire stock in said feeding direction along a path; cutter head means located intermediate said elements and including a plurality of cutter members spaced around said path for engaging the wire stock so that said cutter head means is freely rotatable about said wire stock; turbine vane means fixedly secured to said cutter head means for rotation with the same; and means for supplying fluid under pressure to said turbine vane means for rotating the same with said cutter head means and cutter members on the fed wire stock whereby the same is finished.

2. A peeling machine for finishing wire stock, comprising, in combination, feeding means for feeding the wire stock in one direction and including two stock-guiding elements located vertically aligned for feeding the wire stock in said feeding direction along a vertical path; cutter head means located intermediate said elements and including a plurality of cutter members spaced around said vertical path for engaging the wire stock so that said cutter head means is freely rotatable about said wire stock; turbine vane means fixedly secured to said cutter head means for rotation with the same; and means for supplying fluid under pressure to said turbine vane means for rotating the same with said cutter head means and cutter members on the fed wire stock whereby the same is finished without being subjected to transverse forces.

3. A peeling machine for finishing wire stock, comprising, in combination, feeding means for feeding the wire stock in one direction and including two stock-guiding elements located aligned for feeding the wire stock in said feeding direction along a path; cutter head means located intermediate said elements and including a plurality of cutter members spaced around said path for engaging the wire stock so that said cutter head means is freely rotatable about said wire stock; bearing means located intermediate said stock-guiding elements and supporting said cutter head means in said feeding direction to block axial movement of said cutter head means while supporting said cutter head means for free movement transverse to said feeding path; turbine vane means fixedly secured to said cutter head means for rotation with the same; and means for supplying fluid under pressure to said turbine vane means for rotating the same with said cutter head means and cutter members on the fed wire stock whereby the same is finished.

4. A peeling machine for finishing wire stock, comprising, in combination, feeding means for feeding the wire stock in one direction and including two stock-guiding elements located vertically aligned for feeding the wire stock in said feeding direction along a vertical path; cutter head means located intermediate said elements and including a plurality of cutter members spaced around said vertical path for engaging the wire stock so that said cutter head means is freely rotatable about said wire stock, said cutter head means having at least one bearing surface transverse to said feeding path and leading in said feeding direction; bearing means located intermediate said stock-guiding elements and having at least one stationary bearing surface transverse to said feeding path and confronting said bearing surface of said cutter head means; means for providing pressure fluid between said bearing surfaces to form a fluid cushion between said bearing surfaces for blocking axial movement of said cutter head means in said feeding direction while supporting said cutter head means for free movement transverse to said feeding path; turbine vane means fixedly secured to said cutter head means for rotation with the same; and means for supplying fluid under pressure to said turbine vane means for rotating the same with said cutter head means and cutter members on the fed wire stock whereby the same is finished without being subjected to transverse forces.

5. A peeling machine for finishing wire stock, comprising, in combination, feeding means for feeding the wire stock in one direction and including two stock-guiding elements located vertically aligned for feeding the wire stock in said feeding direction along a vertical path; cutter head means located intermediate said elements and including a plurality of cutter members spaced around said vertical path for engaging the wire stock so that said cutter head means is freely rotatable about said wire stock, said cutter head means having at least one planar horizontal bearing surface leading in said feeding direction; bearing means located intermediate said stock-guiding elements and having at least one planar horizontal stationary bearing surface confronting said bearing surface of said cutter head means; means for providing pressure fluid between said planar horizontal bearing surfaces to form a fluid cushion between said bearing surfaces for blocking axial movement of said cutter head means in said feeding direction while supporting said cutter head means for free movement transverse to said feeding path; turbine vane means fixedly secured to said cutter head means for rotation with the same; and means for supplying fluid under pressure to said turbine vane means for rotating the same with said cutter head means and cutter members on the fed wire stock whereby the same is finished without being subjected to transverse forces.

6. A peeling machine for finishing wire stock, comprising, in combination, feeding means for feeding the wire stock in one direction and including two stock-guiding elements located vertically aligned for feeding the wire stock in said feeding direction along a vertical path; cutter head means located intermediate said elements and including a plurality of cutter members spaced around said vertical path for engaging the wire stock so that said cutter head means is freely rotatable about said wire stock, said cutter head means having at least one bearing surface transverse to said feeding path and leading in said feeding direction, said cutter head means having a central opening in which said cutter members are located and being formed with passage means for chips having an inlet for chips at said central opening and an outlet located outwardly of said bearing surface; bearing means located intermediate said stock-guiding elements and having at least one stationary bearing surface transverse to said feeding path and confronting said bearing surface of said cutter head means; means for providing pressure fluid between said bearing surfaces to form a fluid cushion between said bearing surfaces for blocking axial movement of said cutter head means in said feeding direction while supporting said cutter head means for free movement transverse to said feeding path; turbine vane means fixedly secured to said cutter head means for rotation with the same; and means for supplying fluid under pressure to said turbine vane means for rotating the same with said cutter head means and cutter members on the fed wire stock whereby the same is finished without being subjected to transverse forces.

7. A peeling machine for finishing wire stock, comprising, in combination, feeding means for feeding the wire stock in one direction and including two stock-guiding elements located vertically aligned for feeding the wire stock in said feeding direction along a vertical path; cutter head means located intermediate said elements and including a plurality of cutter members spaced around said vertical path for engaging the wire stock so that said cutter head means is freely rotatable about said wire stock, said cutter head means having a pair of opposite transverse bearing surfaces extending transverse to said feeding path and leading and trailing, respectively, in feeding direction; bearing means located intermediate said stock-guiding elements and having a pair of stationary bearing surfaces transverse to said feeding path and respectively confronting said opposite bearing surfaces of said cutter head means; means for providing pressure fluid between said confronting bearing surfaces to form fluid cushions between said confronting bearing surfaces for blocking axial movement of said cutter head means while supporting said cutter head means for movement transverse to said feeding path; turbine vane means fixedly secured to said cutter head means for rotation with the same; and means for supplying fluid under pressure to said turbine vane means for rotating the same with said cutter head means and cutter members on the fed wire stock whereby the same is finished without being subjected to transverse forces.

8. A peeling machine for finishing wire stock, comprising, in combination, feeding means for feeding the wire stock in one direction and including two stock-guiding elements located vertically aligned for feeding the wire stock in said feeding direction along a vertical path; cutter head means located intermediate said elements and including a plurality of cutter members spaced around said vertical path for engaging the wire stock so that said cutter head means is freely rotatable about said wire stock, said cutter head means having a pair of opposite planar horizontal bearing surfaces leading and trailing, respectively, in feeding direction; bearing means located intermediate said stock-guiding elements and having a pair of planar horizontal stationary bearing surfaces respectively confronting said opposite bearing surfaces of said means for providing pressure fluid between said confronting planar horizontal bearing surfaces to form fluid cushions between said confronting bearing surfaces for blocking axial movement of said cutter head means while supporting said cutter head means for movement transverse to said feeding path; turbine vane means fixedly secured to said cutter head means for rotation with the same; and means for supplying fluid under pressure to said turbine vane means for rotating the same with said cutter head means and cutter members on the fed wire stock whereby the same is finished without being subjected to transverse forces.

9. A machine as claimed in claim 8 wherein said feeding means includes a let-off means for wire stock located on a higher level, and a take-up means for wire stock located at a lower level for feeding the wire stock in downward direction along said vertical path.

10. A peeling machine for finishing wire stock, comprising, in combination, feeding means for feeding the wire stock in one direction and including two stock-guiding elements located aligned for feeding the wire stock in said feeding direction along a path; cutter head means located intermediate said elements and including a plurality of cutter members spaced around said path for engaging the wire stock so that said cutter head means is freely rotatable about said wire stock; rotor means fixedly secured to said cutter head means for rotation with the same; and means non-positively acting on said rotor means for applying a driving force to the same for rotating the same with said cutter head means and cutter members on the fed wire stock whereby the same is finished.

References Cited in the file of this patent

UNITED STATES PATENTS

| | | |
|---|---|---|
| 852,670 | Muller | May 7, 1907 |
| 1,286,992 | Gewont | Dec. 10, 1918 |
| 2,286,931 | Radhe | June 16, 1942 |
| 2,382,526 | White | Aug. 14, 1945 |
| 2,394,381 | Hoern | Feb. 5, 1946 |